US012525208B2

(12) United States Patent
Tagami et al.

(10) Patent No.: US 12,525,208 B2
(45) Date of Patent: Jan. 13, 2026

(54) INFORMATION PROCESSING APPARATUS AND CONTROL METHOD

(71) Applicant: Lenovo (Singapore) Pte. Ltd., Singapore (SG)

(72) Inventors: Yuta Tagami, Kanagawa (JP); Tsutomu Chonan, Kanagawa (JP); Sugumaran Lacshiminarayanan, Kanagawa (JP); Hiroki Oda, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/942,184

(22) Filed: Nov. 8, 2024

(65) Prior Publication Data

US 2025/0218413 A1 Jul. 3, 2025

(30) Foreign Application Priority Data

Dec. 27, 2023 (JP) ................................ 2023-221262

(51) Int. Cl.
*G09G 5/10* (2006.01)

(52) U.S. Cl.
CPC ....... *G09G 5/10* (2013.01); *G09G 2320/0626* (2013.01); *G09G 2330/021* (2013.01); *G09G 2360/08* (2013.01)

(58) Field of Classification Search
None
See application file for complete search history.

(56) References Cited

U.S. PATENT DOCUMENTS 6,618,042 B1 * 9/2003 Powell ................ G09G 3/2092 345/204

FOREIGN PATENT DOCUMENTS

| | | | |
|---|---|---|---|
| JP | 2001-184046 | A | 7/2001 |
| JP | 2010-9538 | A | 1/2010 |
| JP | WO2014/129007 | A1 | 2/2017 |

* cited by examiner

*Primary Examiner* — Aneeta Yodichkas
(74) *Attorney, Agent, or Firm* — Osha Bergman Watanabe & Burton LLP

(57) ABSTRACT

An information processing apparatus includes: a power circuit that receives electricity supplied from a power supply; and a brightness control unit configured to control brightness of a display. The brightness control unit having reference values of brightness setting value that are setting values of the brightness: a first reference value when a power source type is an external power source; and a second reference value that is smaller than the first reference value and when the power source type is a battery. The brightness control unit setting the brightness setting value to a user setting value designated by a user in response to a user operation.

4 Claims, 8 Drawing Sheets

| | EFFICIENCY MODE | BALANCE MODE | PERFORMANCE MODE |
|---|---|---|---|
| DC | LD1 | LD2 | LD3 |
| AC | LA1 | LA2 | LA3 |

INFORMATION PROCESSING APPARATUS AND CONTROL METHOD

CROSS-REFERENCE TO RELATED APPLICATIONS

This application claims priority to Japanese Patent Application No. 2023-221262 filed on Dec. 27, 2023, the contents of which are hereby incorporated herein by reference in their entirety.

TECHNICAL FIELD

The present application relates to an information processing apparatus and a control method, and relates to brightness control of a display, for example.

BACKGROUND

Portable information processing apparatuses such as laptop personal computers (they may be referred to as laptop PCs in this application) are not always used in an environment where the apparatus receives electricity from an external power source. These information processing apparatuses therefore are equipped with a battery that is chargeable and dischargeable, and operate while consuming the electricity stored in the battery. The period during which an apparatus is operable without receiving electricity from an external power source is called a battery life, and it is desirable to extend this life as long as possible.

For instance, Japanese Unexamined Patent Application Publication No. 2010-9538 describes an information processing apparatus including a rechargeable battery and an AC adapter that supplies power to a specified device. This information processing apparatus has a switching button for switching between a process priority mode that supplies electricity to predetermined devices from the AC adapter and a charging mode that shifts some devices to a power saving mode and prioritizes the supply of electricity from the AC adapter to the battery. The apparatus is configured to perform control such that it detects the pressing of the switching button and perform switching between the process priority mode and the charging mode, and perform control such that it detects the remaining capacity of the battery and perform switching between the process priority mode and the charging mode in accordance with the detected remaining capacity of the battery.

To increase the battery life, a battery with a larger capacity can be used. In this case, however, the larger the capacity of the battery, the larger the size of apparatus tends to be. Reducing power consumption remains important to meet the portability requirements of information processing apparatuses. Meanwhile, among the devices of an information processing apparatus, the power consumption of a display may be greater than that of other devices. Such an information processing apparatus is therefore required to reduce the power consumption of the display.

Thus, an information processing apparatus may have a function of determining the brightness of the display according to the power consumption setting and increasing the brightness as the user desires in response to a user operation. This function makes it easier to see the information on the display when the apparatus is used in a brighter environment, such as outdoors during the daytime. However, when returning to a darker environment, it is relatively rare for the user to perform an operation to decrease the increased brightness. If no operation is performed, the brightness may remain high, wasting power.

SUMMARY

An information processing apparatus according to one or more embodiments of the present application includes: a power circuit that receives electricity supplied from a power supply; and a brightness control unit configured to control brightness of a display, the brightness control unit having reference values of brightness setting value that are setting values of the brightness: a first reference value when a power source type is an external power source; and a second reference value that is smaller than the first reference value and when the power source type is a battery, the brightness control unit setting the brightness setting value to a user setting value designated by a user in response to a user operation, when the user setting value is larger than the second reference value and the power source type is switched from an external power source to a battery, the brightness control unit executing a brightness decrease process that decreases the brightness setting value to a value between the user setting value and the second reference value, when a current brightness setting value is smaller than the first reference value and the power source type is switched from a battery to an external power source, the brightness control unit executing a brightness increase process that increases the brightness setting value to a value between the current brightness setting value and the first reference value.

In the above information processing apparatus, when the power source type is switched from a battery to an external power source, in the brightness increase process, the brightness control unit may increase the brightness setting value by an amount of change that is smaller than an amount of change due to a decrease in the brightness setting value in the brightness decrease process.

In the above information processing apparatus, the brightness control unit may update the second reference value on the basis of a frequency of an operation by the user for each brightness setting value.

In the above information processing apparatus, the second reference value may be larger in a power control mode with a higher rated power of a host system, and the brightness control unit may set the brightness setting value as a reference value corresponding to a set of the selected power control mode and the power source type.

A control method according to one or more embodiments of the present application controls an information processing apparatus including a power circuit that receives electricity supplied from a power supply, and a brightness control unit configured to control brightness of a display, the information processing apparatus having reference values of brightness setting value that are setting values of the brightness: a first reference value when a power source type is an external power source; and a second reference value that is smaller than the first reference value and when the power source type is a battery, the method including: setting the brightness setting value to a user setting value designated by a user in response to a user operation; when the user setting value is larger than the second reference value and the power source type is switched from an external power source to a battery, executing a brightness decrease process that decreases the brightness setting value to a value between the user setting value and the second reference value; and when a current brightness setting value is smaller than the first reference value and the power source type is switched from a battery to an external power source, executing a brightness increase process that increases the brightness setting value to a value between the current brightness setting value and the first reference value.

One or more embodiments of present invention reduce power consumption without impairing usability.

DETAILED DESCRIPTION

The following describes embodiments of the present application, with reference to the drawings. First, the following describes the overview of an information processing apparatus 1 according to one or more embodiments of the present application. The following describes the information processing apparatus 1 by way of an example of a laptop PC. The information processing apparatus 1 is not limited to the laptop PC, which may be a tablet terminal, a smart phone, or other apparatuses.

Figure 1:
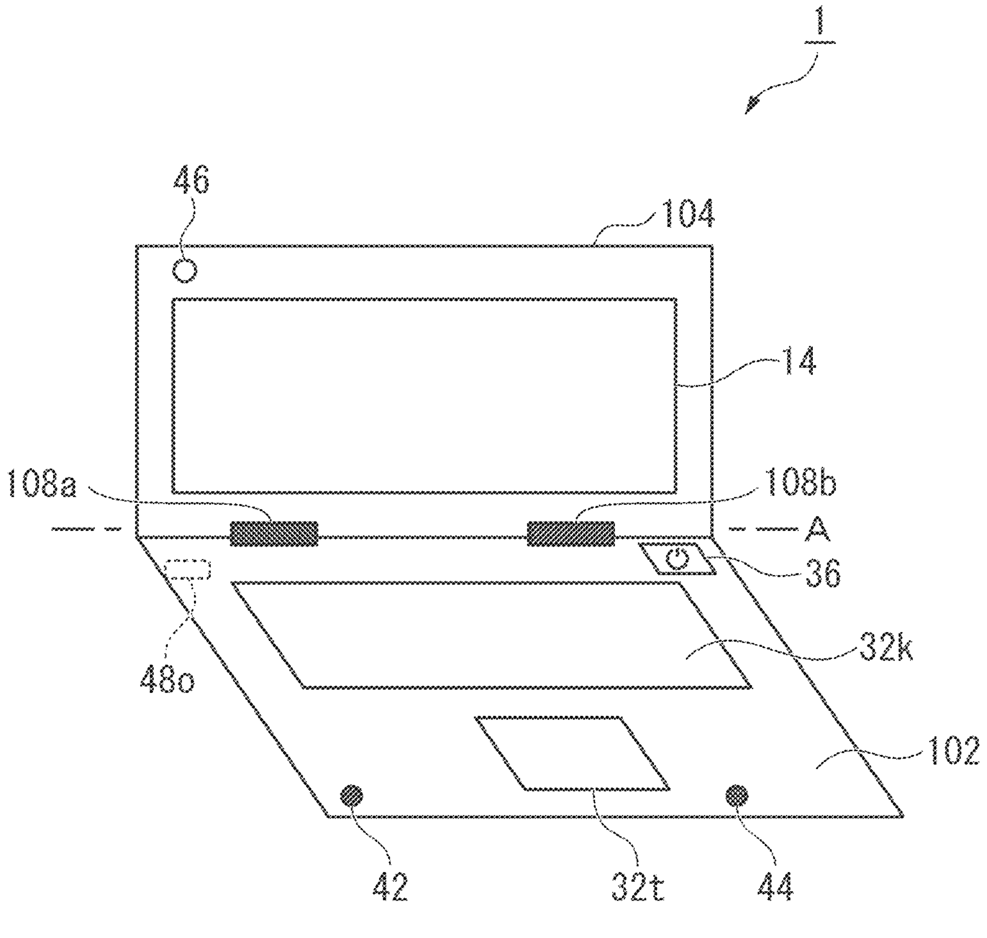
FIG. 1 is an external view illustrating an example of the external configuration of an information processing apparatus according to one or more embodiments.

FIG. 1 is an external view illustrating an example of the external configuration of the information processing apparatus 1 according to one or more embodiments.

The information processing apparatus 1 includes two chassis 102 and 104. These chassis 102 and 104 each have a horizontally-long surface with the width larger than the height, and have a flat shape with the thickness smaller than the height. Side faces of the chassis 102 and 104 are parallel to each other in the width direction and are engaged with each other using hinges 108*a* and 108*b*. One of the chassis 102 and 104 is connected to the other in a rotatable manner around the rotation axis A. That is, the angle between the surfaces of the chassis 102 and 104 (hereinafter this may be referred to as the "opening angle") is variable so that the chassis are open and closed. An opening angle of 0° or an angle close to 0° (e.g., 45° to 60° or less) corresponds to a state in which the chassis 102, 104 are closed. An angle of opening that is sufficiently large (e.g., greater than 45° to 60° corresponds to a state in which the chassis 102 and 104 are open. When no external force is applied to the chassis 102 and 104, the opening angle is maintained constant.

The chassis 102 includes a lid sensor 42 at a location away from the rotation axis A. The lid sensor 42 detects the open/close state of chassis 102 and 104. In the example of FIG. 1, the lid sensor 42 includes a magnetic sensor. The chassis 104 includes a permanent magnet 46 at a location facing the lid sensor 42 when the chassis 104 and 102 are closed. When the chassis 102 and 104 are closed, the magnetic sensor detects a relatively strong magnetic field because it is close to the permanent magnet. When the chassis 102 and 104 are open, the magnetic field detected is much weaker because it is away from the permanent magnet. In this way, the open/closed state of the chassis 102 and 104 is determined on the basis of the strength of the detected magnetic field. In the example of FIG. 1, the chassis 102 further includes an acceleration sensor 44.

The chassis 102 comes with a keyboard 32*k*, a touch pad 32*t*, and a power button 36 on the surface. The chassis 102 has a slot (outlet) 48*o* on the side face in the width direction. This slot 48*o* has a hollow, into which the plug of an AC adapter 48 is insertable, and when the inserted plug fits into it, the slot fixes the plug in place to keep the plug in contact with an electrode on the inner face of the hollow. DC power is supplied to the information processing apparatus 1 from the AC adapter 48 via the plug inserted into the slot 48*o*.

The AC adapter 48 receives AC power from a commercial power source and converts the AC power into DC power having a constant voltage (e.g., 3 V to 12 V).

The chassis 104 comes with a display 14 on the surface. The display 14 covers most of the surface of the chassis 104.

Figure 2:
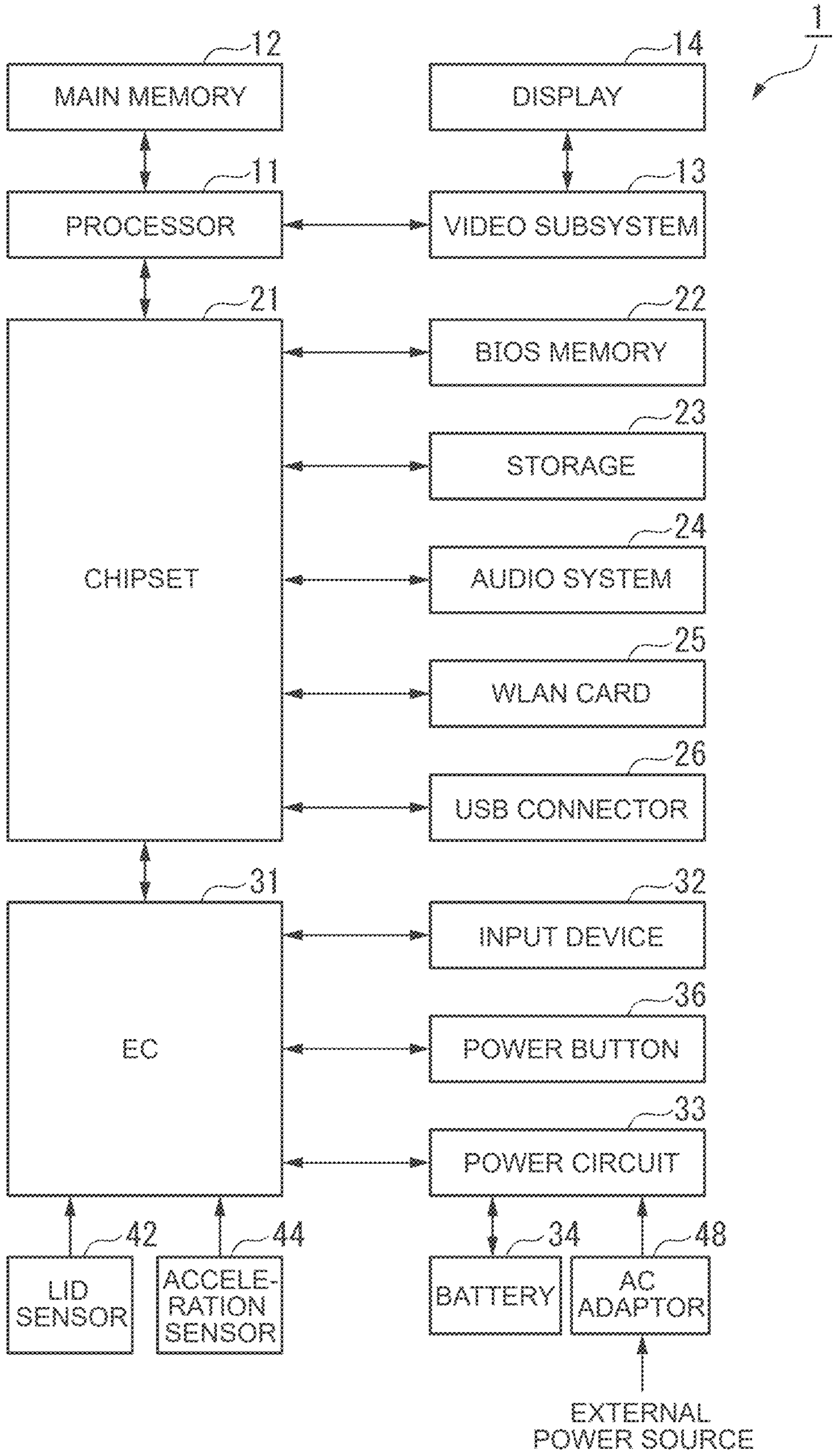
FIG. 2 is a schematic block diagram illustrating one example of the hardware configuration of the information processing apparatus according to one or more embodiments.

FIG. 2 is a schematic block diagram illustrating one example of the hardware configuration of the information processing apparatus 1 according to one or more embodiments. The information processing apparatus 1 includes a processor 11, a main memory 12, a video subsystem 13, the display 14, a chipset 21, a basic input-output system (BIOS) memory 22, a storage 23, an audio system 24, a wireless local area network (WLAN) card 25, a universal serial bus (USB) connector 26, an embedded controller (EC) 31, an input device 32, a power circuit 33, a battery 34, the power button 36, the lid sensor 42 and the acceleration sensor 44.

The processor 11 executes arithmetic processing in accordance with various commands written in a program to control the operation of the information processing apparatus 1 as a whole. For instance, the processor 11 includes one or more central processing units (CPUs).

The main memory 12 is a writable memory functioning as a read-in area of a program executed by the processor 11 or a work area to write the data processed by the executed program. The main memory 12 includes one or more dynamic random access memory (DRAM) chips, for example. The program includes an operating system (OS), a driver for controlling the operations of peripherals, various service/utility programs (they may be referred to as "utility" in this application), and application programs (they may be referred to as "app" in this application).

Figure 3:
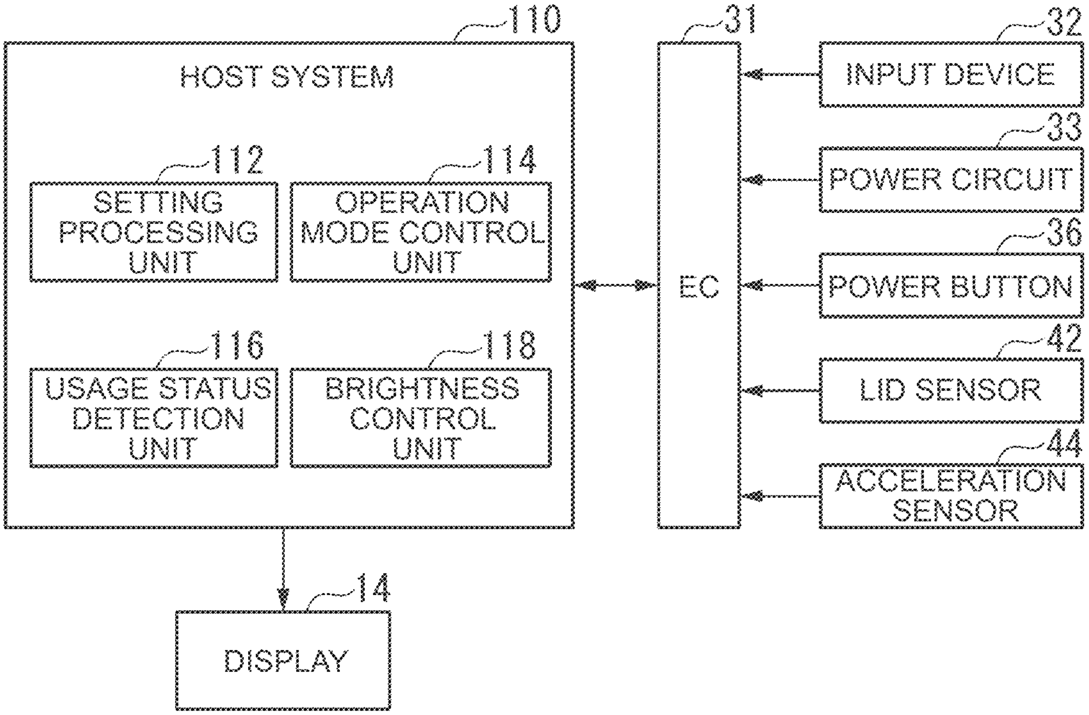
FIG. 3 is a schematic block diagram illustrating one example of the functional configuration of the information processing apparatus according to one or more embodiments.

The processor 11, main memory 12, and chipset 21 are minimum hardware that makes up a host system 110 (FIG. 3). In this application, the devices that make up the host system 110 may be collectively referred to as a "system device". The system device may be configured as an integrated component (e.g., a system-on-chip (SoC)). The host system 110 is the core computer system of the information processing apparatus 1. The processor 11 executes a predetermined program and works with the main memory 12 and other hardware to implement the functions of the host system 110. In this application, "executing a program" or "execution of a program" includes the meaning of performing the processing directed by the commands written in the program.

The video subsystem 13 is a subsystem to implement the functions relating to image display. The video subsystem 13 includes a video controller (not illustrated). The video controller performs the processing directed by the drawing commands input from the processor 11 and writes the display data obtained by the processing to the video memory (not illustrated) that the video controller has. The video controller reads the written display data from the video memory and outputs the read display data to the display 14.

The display 14 displays various types of display screen on the basis of the display data input from the video subsystem 13. The display 14 may be any type of display, such as a liquid crystal display (LCD) or an organic light emitting diode (OLED) display.

The display 14 includes a pixel panel and power and video circuitry (not illustrated). The surface of the pixel panel is a two-dimensional plane, with a plurality of pixels arranged at regular intervals. Each pixel emits light when electricity is supplied from a drive circuit.

The power and video circuitry converts the electricity supplied from the power circuit 33 into driving power for emitting light with a brightness corresponding to the signal value for each pixel indicated in the display data input from the video subsystem 13. An image is expressed by the distribution of brightness of the pixels. The power and video circuitry multiplies the generated driving power by a gain to adjust the intensity of the driving power. Adjusting the intensity controls the brightness of the image shown on the display. The power and video circuitry outputs the intensity-adjusted driving power for each pixel to the drive circuit.

The power and video circuitry has brightness setting information set beforehand therein, indicating the correspondence between a setting value of brightness (this may be referred to as a "brightness setting value" in this application) and a gain. The power and video circuitry refers to the brightness setting information, identifies a gain corresponding to the brightness setting value notified by the host system, and adjusts the intensity of the driving power using the identified gain.

The chipset 21 connects to one or more peripheral devices and controls the input and output of various types of data. The chipset 21 comes with various input/output interfaces and connects devices supporting these interfaces. The chipset 21 comes with a controller supporting various types of input/output methods. For instance, the chipset 21 includes a controller relating to any one or any combination of a universal serial bus (USB), a serial advanced technology attachment (ATA), a serial peripheral interface (SPI) bus, a peripheral component interconnect (PCI) bus, a PCI-Express bus, and a low pin connect (LPC) bus. The example of FIG. 2 illustrates the BIOS memory 22, the storage 23, the audio system 24, the WLAN card 25, the USB connector 26, and the EC 31 that are peripheral devices connected to the chipset 21.

The BIOS memory 22 stores system firmware such as the BIOS in advance. The BIOS memory 22 may store firmware to control the operation of the EC 31 and other devices. The BIOS memory 22 includes a non-volatile memory that is rewritable, such as an electrically erasable programmable read only memory (EEPROM) or a flash ROM.

The storage 23 includes an auxiliary storage device that stores various programs and data executed by the processor 11. The storage 23 includes a rewritable non-volatile memory. The storage 23 may be any of a solid state drive (SSD) and a hard disk drive (HDD).

The audio system 24 performs input, output, and recording of audio data. The audio system 24 may include a speaker. The speaker emits sound based on the audio data input to the speaker. The audio system 24 may include a microphone. The microphone picks up sounds that reach there and obtains audio data that indicates the picked up sounds. The WLAN (wireless LAN) card 25 connects to a wireless LAN and performs data communication with other devices directly or indirectly connected to the wireless LAN. A wireless LAN enables the devices to transmit and receive various types of data in accordance with a specific wireless communication standard (e.g., IEEE802.11).

The USB connector 26 connects peripheral devices in accordance with the universal serial bus (USB) standard so as to enable data input/output.

The EC 31 monitors the operating environment and controls the states of various devices (e.g., peripheral devices, and sensors) regardless of the system state of the host system. The EC 31 includes its own processor, memory, and input/output terminal, and is configured as a microcomputer. The EC 31 connects to the input device 32, the power circuit 33, the power button 36, the lid sensor 42, the acceleration sensor 44, and others via its input/output terminal.

The input device 32 detects an operation by a user, and outputs an operation signal corresponding to the detected operation to the EC 31. The touchpad **32*t* and keyboard 32*k* as described above belong to the input device 32. The input device 32 may include a touch sensor. The touch sensor may overlap the display 14** and be configured as a touch panel.

The power circuit 33 converts the voltage of DC power supplied from an external power source via the AC adapter 48 or from the battery 34 into a voltage required for the operation of each device that constitutes the information processing apparatus 1, and supplies the electricity having converted voltage to the device. The power circuit 33 controls whether or not electricity is required to be supplied to each device of the information processing apparatus 1 in accordance with the control of the EC 31. The power circuit 33 includes a converter that converts the voltage of electricity supplied thereto, and a charge/discharge unit that charges the battery 34 with the electricity whose voltage has been converted. The charge/discharge unit charges the battery 34 with the electricity supplied by the AC adapter 48 that is left unconsumed at each device. If electricity is not supplied from the AC adapter 48, or if the electricity supplied from the AC adapter 48 is insufficient for the required one, the electricity discharged from the battery 34 is supplied to each device via the converter. The electricity-supply destinations include the system device and peripheral devices such as the display 14 and the EC 31.

The power circuit 33 is electrically connected to the power supply terminal provided in the slot **48*o*. The power circuit 33 receives DC power from the AC adapter 48 attached to the slot 48*o* via the power supply terminal. The power circuit 33 may include a voltage sensor that detects the voltage of the power supply terminal, and output a voltage detection signal indicating the detected voltage to the EC 31. The EC 31 is capable of detecting, on the basis of the voltage detection signal input from the voltage sensor, whether the type (this may be referred to as "power source type" in this application) of the power source supplying electricity to the information processing apparatus 1 is an external power source or the battery 34. Whether the electricity supplied from the external power source or the electricity supplied from the battery 34 is consumed depends on whether the AC adapter 48 is attached to the slot 48***o* so as to be capable of supplying DC power. For instance, the EC 31 determines whether the power source type is an external power source or the battery 34 by whether the voltage indicated by the voltage detection signal is higher than a predetermined voltage reference value. The EC 31 notifies the host system 110 of the determined power source type.

The battery 34 is housed inside the chassis 102. The battery 34 is charged with electricity supplied from the AC adapter 48 by the charge/discharge unit of the power circuit, and supplies the charged electricity to each device via the converter. The battery 34 has a secondary battery that is chargeable and dischargeable. For instance, the battery 34 has a lithium-ion battery.

Each time the power button 36 is pressed, it controls the state of electricity supply to the host system 110 of the information processing apparatus 1 to either on (power ON) or off (power OFF). In response to the acceptance of the pressing operation, the power button 36 outputs a pressing signal indicating the pressing to the EC 31.

The lid sensor 42 detects whether the chassis 102 and 104 are open or closed. The lid sensor 42 generates a detection signal indicating the detected open/close state and outputs it to the EC 31. The EC 31 identifies the open/close state on the basis of the detection signal input from the lid sensor 42. Assume that the lid sensor 42 is a magnetic sensor. Then, the EC 31 is capable of determining whether the chassis 102 and 104 are closed or not by whether the intensity of the magnetic field indicated in the detection signal is above a predetermined intensity threshold. The EC 31 notifies the host system of the open/close state information indicating the determined open/close state. In the following description, a state in which the chassis 102 and 104 are open may be referred to as an "open state" (lid open), and a state in which the chassis 102 and 104 are closed may be referred to as a "closed state" (lid closed). The EC 31 notifies the host system 110 of the determined open/closed state via the chipset 21. The open/closed state notified to the host system may be used to control the system state.

The acceleration sensor 44 detects the acceleration applied thereto and outputs an acceleration signal indicating the detected acceleration to the EC 31. For instance, the acceleration sensor 44 is a three-axis sensor. The three-axis sensor is capable of detecting acceleration in axial directions perpendicular to each other in a three-dimensional space. The EC 31 outputs the acceleration signal input from the acceleration sensor 44 to the host system. The acceleration notified to the host system also may be used to control the system state.

Next the following describes an example of the functional configuration of the information processing apparatus 1 according to one or more embodiments. FIG. 3 is a block diagram schematically showing one example of the functional configuration of the information processing apparatus 1 according to one or more embodiments.

The host system 110 of the information processing apparatus 1 includes a setting processing unit 112, an operation mode control unit 114, a usage status detection unit 116, and a brightness control unit 118.

The setting processing unit 112 sets various parameters in the host system in response to user operations. The setting processing unit 112 causes the display 14 to display a setting screen. The setting screen includes the parameters that the user is allowed to set and the setting values of the parameters that are set at that point of time. The setting processing unit 112 selects a power control mode designated by an operation signal input via the EC 31 from among a plurality of stages predetermined power control modes. The setting processing unit 112 notifies the brightness control unit 118 of the selected power control mode.

The host system 110 operates in accordance with the selected power control mode. The power consumption of the host system 110 varies with the power control mode. Individual power control modes are defined using parameters related to the power consumption of the host system 110. The parameters related to the power control mode include the rated power of the CPU (e.g., PL1: Power Limit 1). Generally, the higher the rated power, the more power consumed and therefore the greater the processing power of the host system 110. The lower the rated power, the lower power consumed and therefore the lower the processing power of the host system 110.

The setting processing unit 112 may configure a guide screen including power-source type information representing the power source type notified by the EC 31 and cause the display 14 to display the configured guide screen.

Figure 4:
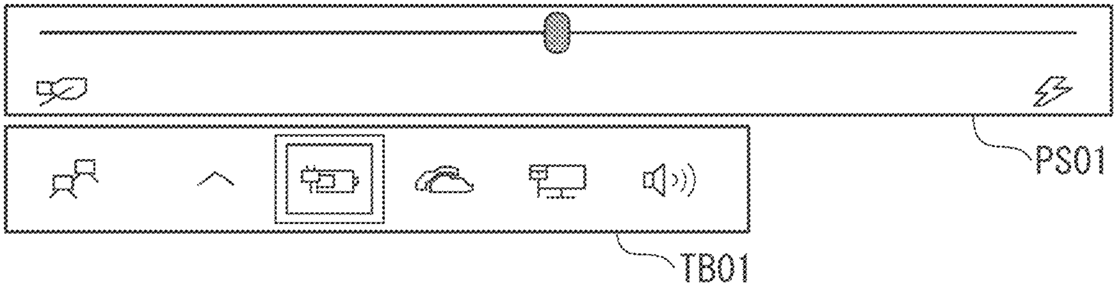
FIG. 4 illustrates a setting screen and a guide screen according to one or more embodiments.

FIG. 4 illustrates a setting screen PS01 and a guide screen TB01 according to one or more embodiments. The setting screen PS01 and the guide screen TB01 illustrated each have an elongated shape with the horizontal width larger than the vertical height. The setting screen PS01 and guide screen TB01 may be placed at a position adjacent to the bottom of the display area of the display 14. The setting screen PS01 has a slider bar that allows a user to select one of three staged power control modes by their operation. The three-staged power control modes include efficiency mode (Best Power Efficient), balance mode (Balanced) and performance mode (Best Performance), placed from the left to right in this order. Of the three power control modes, efficiency mode has the lowest power rating, followed by balanced mode, and performance mode, in that order. The guide screen TB01 is configured as a task bar, in a center of which an icon is displayed that depicts a schematic representation of a pair of power plug and a battery. This display indicates that the power source type is an external power source.

The operation mode control unit 114 controls the system state (operation mode) of the host system 110 on the basis of the usage status of the information processing apparatus 1. The operation mode control unit 114 has a transition condition for each pair of one system state 1 and another system state 2. The transition condition is set in advance to represent the transition condition from the system state 1 as a transition source to the system state 2 as a transition destination. The operation mode control unit 114 refers to the transition condition from the current system state 1 to the system state 2 and transitions the current system state 1 to the system state 2 when the operating state or usage environment at the present time meets the transition condition to the system state 2 on the basis of the usage status of the information processing apparatus 1. The operation mode control unit 114 notifies the EC 31 of the system state determined by the control via the chipset 21.

The system states include normal mode, modern standby, hibernation, and power off. Normal mode, hibernation, and power off correspond to the S0 state, S4 state, and S5 state, respectively, among the system states defined by the advanced configuration and power interface (ACPI) standard. Modern standby, which is a hibernation state that consumes less power than normal mode, is an extension of the S0 state. Modern standby may be described as the S0ix or S0i3 state. Generally, power consumption decreases in the following order: normal mode, modern standby, hibernation, and power off.

Normal mode is the normal system state. In the normal mode, when the display 14 is operating and the system state is normal mode, where the display screen is displayed in accordance with the display data output from the host system 110, then the brightness control unit 118 performs the brightness control described below. In other system states, the screen display on the display 14 is stopped, so the brightness control unit 118 does not control the brightness of the display 14.

Next, an example of a transition condition of the system state will be described. The conditions for transitioning from normal mode to modern standby include the following situations detected: when the display screen does not change for a certain period of time (e.g., 3 to 10 minutes) or more and no operation signal is detected from the input device 32; when there is no app to be instructed to start; when the opening/closing state of the chassis 102 and 104 changes from the open state to the closed state; and when the acceleration indicated by the acceleration signal from the acceleration sensor 44 is greater than a predetermined reference value. In modern standby, some peripheral devices, such as the storage 23 and the WLAN card 25, as well as the EC 31, may continue to operate. The host system 110 also may wait for an operation signal from the input device 32 via the EC 31 and the chipset 21.

The conditions for transitioning from modern standby to normal mode include: when an operation signal is input from the input device 32; when a press signal is input from the power button 36; when the opening/closing state of the chassis 102 and 104 changes from the closed state to the open state; and when the acceleration indicated by the acceleration signal from the acceleration sensor 44 falls below a predetermined reference value for a predetermined period of time or more.

The conditions for transitioning from modern standby to hibernation include: when the actual power consumption falls below the power consumption reference value; when modern standby continues for a certain period of time (e.g., 10 to 30 minutes) or more; when the time at that point reaches a preset hibernation time; when sleep is instructed by an operation signal; and when the remaining capacity of battery 34 falls below a specified limit value.

The conditions for transitioning from normal mode or modern standby to power off include: when a press signal is input from the power button 36; and when a specific request is issued from the OS.

In the modern standby or power-off state, the operation of the host system 110 is stopped, so the operation mode control unit 114 is not involved in the transition from the modern standby or power-off state to the normal mode. The transition from the power-off state to the normal mode is performed by a booting process based on the BIOS. In the transition from modern standby to normal mode, the EC 31 resumes power supply to the host system 110, loads the image data stored in the storage 23 into the main memory 12, and then boots the OS.

The usage status detection unit 116 detects the usage status of the information processing apparatus 1. The usage status detection unit 116 detects the usage status related to the control of the system state and the usage status related to the brightness control, or a change therein. For instance, the usage status detection unit 116 detects: input of an operation signal from the input device 32 via the EC 31; notification of the power source type from the EC 31; input of a press signal from the power button 36 via the EC 31; notification of the opening/closing state information of the chassis 102, 104; input of an acceleration signal from the acceleration sensor 44 via the EC 31; and a change in the display data output to the display 14. Among them, the operation signal, press signal, opening/closing state information, acceleration signal and others are used to control the system state. The operation signal, power source type information, and others are used for brightness control.

The brightness control unit 118 controls the brightness of the display screen displayed on the display 14 in accordance with the usage status of the information processing apparatus 1. The brightness control unit 118 determines the reference value of the brightness setting value on the basis of the power source type notified by the usage status detection unit 116. When the power source type is the battery 34, the brightness control unit 118 determines the brightness setting value to be lower than the reference value when the power source type is an external power source. This is because when the power source type is the battery 34, it is highly necessary to reduce the power consumption by making the display screen displayed on the display 14 darker than when the power source type is an external power source.

Every time the brightness control unit 118 sets the brightness setting value, it notifies the display 14 of the set brightness setting value. The brightness control unit 118 notifies the display 14 of the brightness setting value, thus causing the display screen to be displayed with the brightness corresponding to that set value.

The brightness control unit 118 may further consider the power control mode notified by the setting processing unit 112 to determine a reference value for the brightness setting value. The brightness control unit 118 sets a larger value as the reference value of the brightness setting value for a power control mode with higher rated power. This is because when increasing the processing power of the host system 110, the display 14 is expected to display a brighter screen. To this end, the brightness control unit 118 has a brightness setting table that is set in advance, indicating a default brightness setting value for each set of power control mode and power source type. The brightness control unit 118 refers to this brightness setting table to identify the brightness setting value corresponding to the set of the instructed power control mode and the notified power source type, and sets the identified brightness setting value to the display 14.

Figures 5, 6:
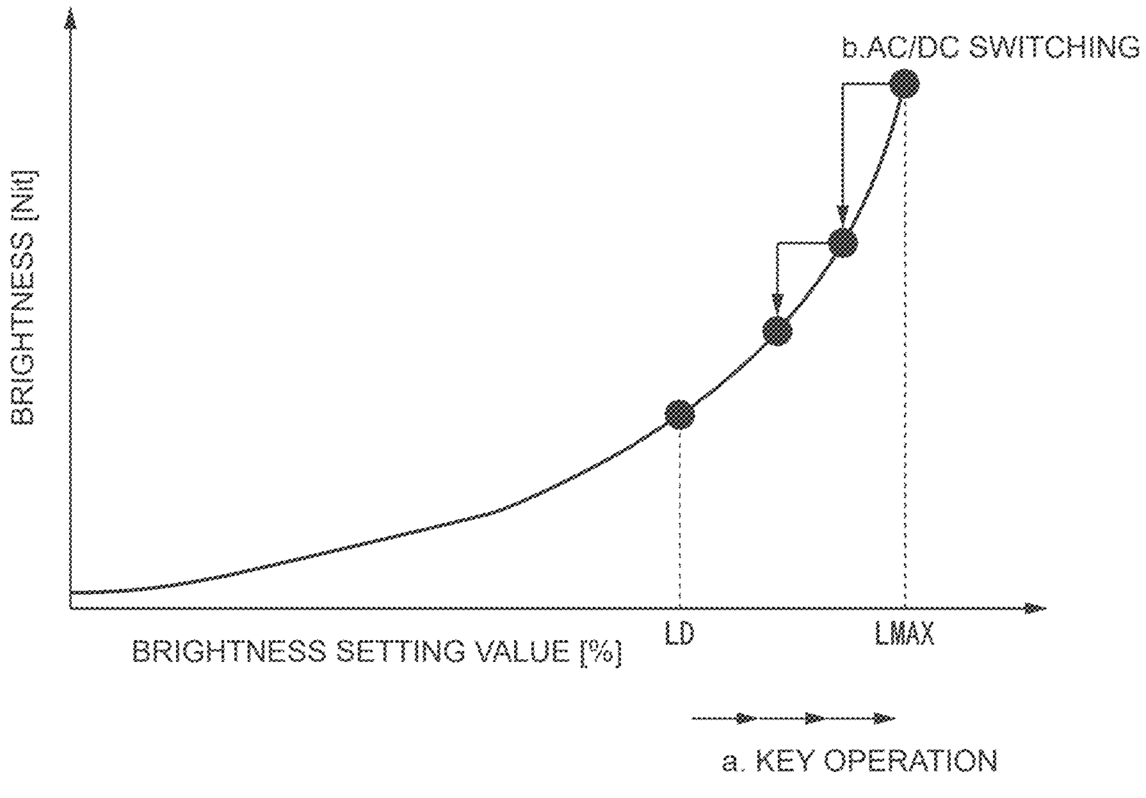
FIG. 5 illustrates a setting example of the brightness setting table according to one or more embodiments.
FIG. 6 illustrates a first example of a transition of the brightness setting value due to a change in the usage status.

FIG. 5 illustrates a setting example of the brightness setting table according to one or more embodiments. The brightness setting table is a data table that indicates a default brightness setting value that is a reference value of brightness setting value for each set of power control mode and power source type. The default brightness setting value is higher for a power control mode with higher rated power and is higher when the power source type is an external power source than when the power source type is the battery 34. In FIG. 5, each row indicates the power source type and each column indicates the power control mode. In the columns of power source type, DC indicates a battery, and AC indicates an external power source. The power control modes listed include efficiency mode, balanced mode, and performance mode. When the power source type is a battery, the reference values are set so that LD1<LD2<LD3. When the power source type is an external power source, the reference values are set so that LA1<LA2<LA3. For the power control modes, the reference values are set such that LD1<LA1, LD2<LA2, and LD3<LA3. Note that LD3=LA3 may be set for the performance mode.

Depending on the usage environment and the user's preferences, a brightness higher than the brightness determined based on either or both of the power source type and the power control mode may be desired. For instance, the surroundings are bright outdoors during the daytime, so that it is desirable to brighten the screen on the display.

Thus, the brightness control unit 118 may adjust the brightness setting value in response to a predetermined operation. In this application, the brightness setting value adjusted in response to a user's operation may be referred to as a "user setting value." For instance, the brightness control unit 118 increases the brightness setting value by a predetermined increment each time it detects an operation on a predetermined key on the keyboard 32*k* (e.g., pressing of F6 key). However, when the brightness setting value reaches a preset maximum value, even if the brightness control unit 118 detects the operation, it does not perform the processing to further increase the brightness setting value.

The brightness control unit 118 monitors the power source type notified by the usage status detection unit 116. If the power source type is changed from external power source to the battery 34 and the brightness setting value at that point of time is higher than the reference value of brightness setting value when the power source type is the battery 34, the brightness control unit 118 decreases the brightness setting value at that point of time. Note here that the brightness setting value after the decrease is set to a value greater than the reference value. In this way, when the power source type switches from an external power source to the battery, the process is performed to decrease the brightness setting value to a value between the user setting value and the reference value when the power source is the battery 34. This process may be referred to as a "brightness decrease process."

Note that the user may notice a reduction in brightness due to such a decrease in the brightness setting value, and they may try to operate to increase the brightness setting value again. If the brightness is increased by this operation, the power consumption increases again. To avoid this, the amount of change in brightness setting value when the power source type is changed from an external power source to the battery 34 may be set to an amount that does not cause the user to notice the change in brightness. For instance, it may be about several percent to 10% of the value range of the brightness setting value.

Each time the notified power source type is changed from external power source to the battery 34, the brightness control unit 118 may decrease the brightness setting value by a constant amount of change until it reaches the reference value corresponding to the battery 34.

For a smaller brightness setting value, the brightness control unit 118 may reduce the amount of change in brightness setting value in response to a change in the power source type to the battery 34. For instance, the brightness control unit 118 may reduce the brightness setting value at that point of time by a certain rate of change (e.g., 5 to 10%), each time the power source type is changed to the battery 34. When the brightness setting value is reduced at a constant rate of change, the amount of change in brightness setting value decreases each time reduction in the brightness setting value is repeated.

Next, the relationship between the brightness setting value set by the brightness control unit 118 and the brightness of the screen displayed on the display 14 will be described. The brightness setting value may be the brightness, which is a physical quantity, or may be an index value that uniquely corresponds to the brightness. The brightness setting value may be normalized to a real value that is easily perceived by the user. The brightness setting value is a real number within a predetermined value range (e.g., from 0% to 100%). A higher brightness setting value indicates a higher brightness, where 0% and 100% correspond to the minimum and maximum brightness values, respectively. For the brightness setting values, a value defined in advance in software such as the OS or the device driver of the display 14 may be used. Based on these pieces of software, the brightness control unit 118 may cause the display 14 to display a setting screen including screen components such as a dial and a slider bar, allowing a user to set the brightness setting values in response to the user's operation as they intend.

As described above, the display 14 is configured to supply the pixels with driving power having an intensity obtained by multiplying the intensity corresponding to the signal value shown in the display data by the gain corresponding to the brightness setting value. As illustrated in FIG. 6, the brightness of the displayed image tends to increase with the brightness setting value. Also, as the brightness setting value increases, the ratio of the increase in brightness to the increase in the brightness setting value increases.

Next, an example of a transition of the brightness setting value due to a change in the usage status will be described with reference to FIG. 6. At the beginning of use of the information processing apparatus 1, the brightness control unit 118 sets a reference value of brightness setting value as the initial value LD, which corresponds to the set of power control mode and power source type. Then, the display screen is displayed on the display 14 at the brightness determined based on the set brightness setting value. Here, it is assumed that the user wishes to brighten the display screen and performs a predetermined key operation (a. key operation). The brightness control unit 118 increases the brightness setting value by a predetermined increment each time a key operation is detected. This increase in brightness setting value increases the brightness of the display screen shown on the display 14. Each time a key operation is detected, the brightness setting value increases until it reaches a maximum value LMAX.

Thereafter, it is assumed that the user removes the AC adapter 48 from the information processing apparatus 1 (b. AC/DC switching). In this case, the EC 31 detects the removal of the AC adapter 48 and detects a change in power source type from the external power source to the battery 34. The brightness control unit 118 decreases the brightness setting value at a constant rate of change each time a change in the type of power source from an external power source to the battery 34 is detected. The brightness of the display screen decreases with the brightness setting value.

When the host system 110 stops operating, that is, when the system state changes from normal mode to power-off mode, the brightness control unit 118 may save the brightness setting value at that point of time in the storage 23. Then, when the host system 110 resumes operation, the brightness control unit 118 may read the brightness setting value stored in the storage 23. The brightness control unit 118 may use the read brightness setting value as the brightness setting value at that point of time, and notify the display 14 of it. This allows the display 14 to be used at the brightness indicated by the brightness setting value before the operation was stopped.

Furthermore, each time the power control mode notified by the setting processing unit 112 is changed, the brightness control unit 118 may update the brightness setting value to the reference value corresponding to the set of the power control mode and the power source type.

When the host system 110 stops operating, the brightness control unit 118 may associate the brightness setting value with the set of the power control mode and power source type at that point of time and save it in the storage 23. Each time either or both of the power control mode and the brightness setting value is changed, the brightness control unit 118 may read the brightness setting value corresponding to the set of the power control mode and the power source type after change from the storage 23. This allows the display 14 to be used with the brightness indicated by the brightness setting value corresponding to the set of the power control mode and brightness setting value.

Figure 7:
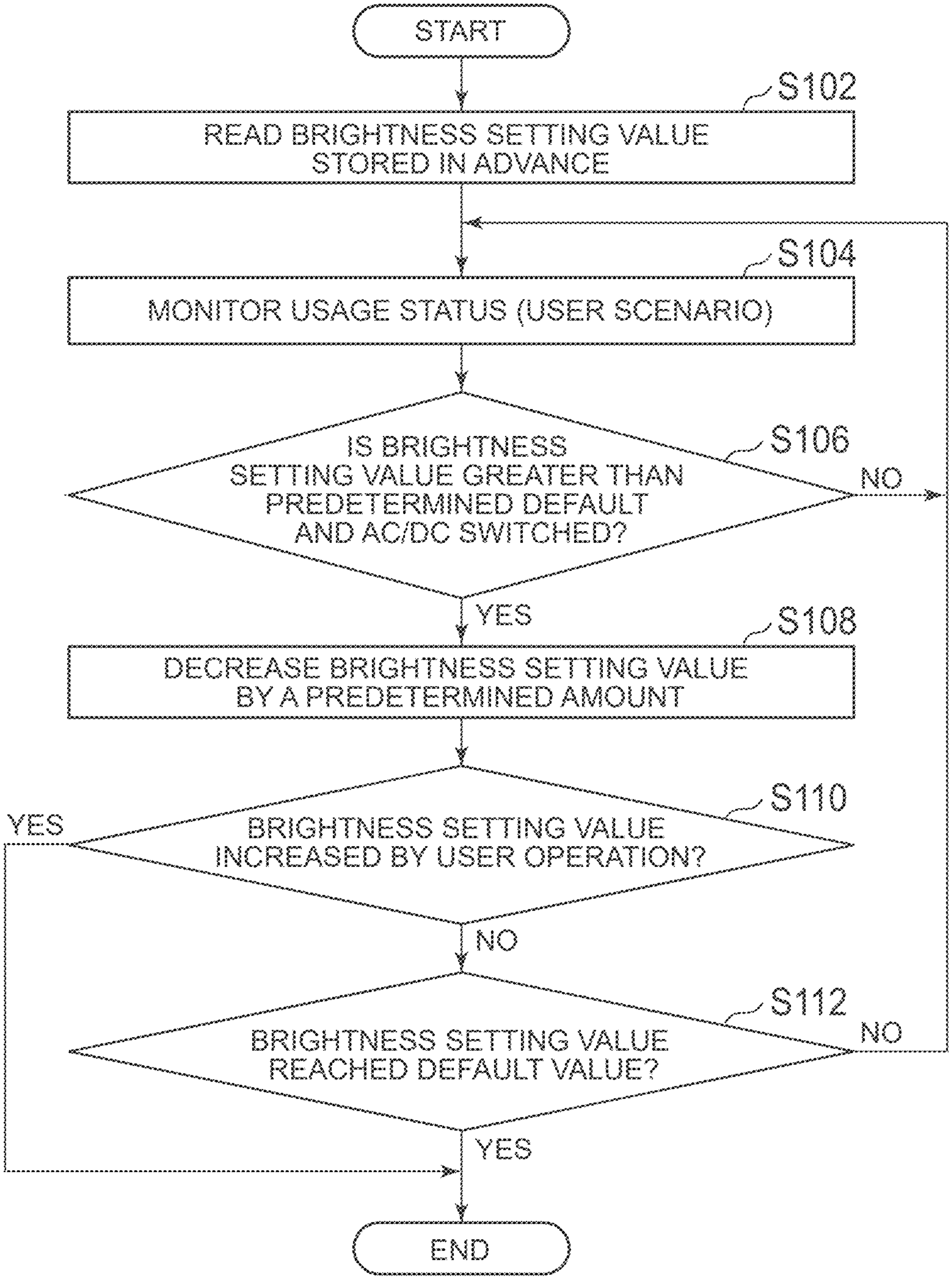
FIG. 7 is a flowchart illustrating an example of the brightness control according to one or more embodiments.

Next, the following describes an example of the brightness control according to one or more embodiments. FIG. 7 is a flowchart illustrating an example of the brightness control according to one or more embodiments. FIG. 7 illustrates the process from when a previously stored brightness setting value is read out until the brightness setting value decreases to a reference value (default value) due to a change in the power source type to the battery 34, or until an increase in the brightness setting value is instructed by a user operation. A user operation is an expression of intent by the user, and automatic settings that go against the expressed intent are avoided.

(Step S102) The brightness control unit 118 reads the brightness setting value last stored in the storage 23 in advance and sets the read brightness setting value to the display 14. When reading the brightness setting value, the brightness control unit 118 calls driver software and communicates with the OS.

(Step S104) The usage status detection unit 116 monitors the usage status (user scenario) of the information processing apparatus 1. When the system state is the S0 state, the usage state detection unit 116 proceeds to the process of step S106.

(Step S106) The brightness control unit 118 determines whether the brightness setting value set at that point of time is greater than the reference value and whether the power source type is changed from external power source to the battery 34 (AC/DC switching). The brightness control unit 118 refers to the brightness setting table and specifies a reference value (default value) of brightness setting value that corresponds to the power source type and power control mode that are set at that point of time. If it is determined that the brightness setting value is greater than the reference value and that the power source type has been changed to the battery 34 (step S106 YES), the process proceeds to step S108. If it is determined that the brightness setting value is equal to or less than the reference value or that the power source type has not been changed to the battery 34 (step S106 NO), the process returns to step S104.

(Step S108) The brightness control unit 118 decreases the brightness setting value at that point of time by a predetermined amount of change.

(Step S110) The brightness control unit 118 monitors about whether or not an increase in brightness setting value is instructed by a predetermined user operation. If an increase in brightness setting value is instructed (step S110 YES), the brightness control unit 118 increases the brightness setting value by a predetermined increment and sets the increased brightness setting value to the display 14. After that, the process of the FIG. 7 ends. Note here that, when the brightness setting value reaches the maximum value LMAX, the brightness control unit 118 does not change the brightness setting value. Thereafter, the process may proceed to step S104.

If an increase in brightness setting value is not instructed (step S110 NO), the process proceeds to step S112.

(Step S112) The brightness control unit 118 determines whether or not the brightness setting value has reached the predetermined reference value (default value). If it is determined that the brightness setting value has reached the predetermined reference value (step S112 YES), the process of FIG. 7 ends. If it is determined that it has not been reached (step S112 NO), the brightness control unit 118 decreases the brightness setting value by a predetermined amount of change and sets the decreased brightness setting value to the display 14. Then, the process returns to step S104.

Next, the following describes one or more embodiments of the present application, mainly about differences from the above embodiments. Unless otherwise specified, the components and others are common to the above embodiments and the explanation therefor is incorporated herein by reference.

The brightness control unit 118 in one or more embodiments also monitors the power source type notified by the usage status detection unit 116. If the power source type is changed from external power source to the battery 34 and the brightness setting value at that point of time is higher than the reference value of brightness setting value when the power source type is the battery 34, the brightness control unit 118 decreases the brightness setting value at that point of time by a predetermined amount of change (decrement).

The brightness control unit 118 according to one or more embodiments decreases the brightness setting value when the power source type is changed to the battery 34, and after that, when the power source type is changed from the battery 34 to an external power source, increases the brightness setting value at that point of time. In this way, when the brightness setting value is smaller than the reference value when the power source type is external power source, and the power source type is switched from the battery 34 to external power source, the process is performed, increasing the brightness setting value to a value between the current brightness setting value and the reference value when the power source type is external power source. This process may be referred to as a "brightness increase process." Note here that the increment in brightness setting value due to a change in power source type to an external power source may be equal to or less than the decrement in the brightness setting value due to a change in power source type to the battery 34.

For instance, assume the case where the decrement in brightness setting value when the power source type is changed to the battery 34 is set to a constant value. In this case, the brightness control unit 118 may set a value that is the increment in brightness setting value when the power source type is changed to external power source, the value being less than the absolute value of the decrement in the brightness setting value.

For a smaller brightness setting value, the brightness control unit 118 may decrease the decrement in brightness setting value due to a change in power source type to the battery 34. In this case, the smaller the brightness setting value, the more the brightness control unit 118 may decrease the increment in brightness setting value due to a change in power source type to an external power source.

The brightness control unit 118 may determine the decrement in brightness setting value due to a change in power source type to the battery 34 on the basis of a constant rate of decrease in the brightness setting value at that point in time. In this case, the brightness control unit 118 may determine the increment in brightness setting value due to a change in power source type to an external power source on the basis of a constant rate of increase in the brightness setting value at that point in time. Note here that the rate of increase of the brightness setting value is set smaller than the rate of decrease of the brightness setting value. For instance, if the rate of decrease of brightness setting value is set to 10 to 15%, the rate of increase of brightness setting value may be set to 5 to 8%.

Figure 8:
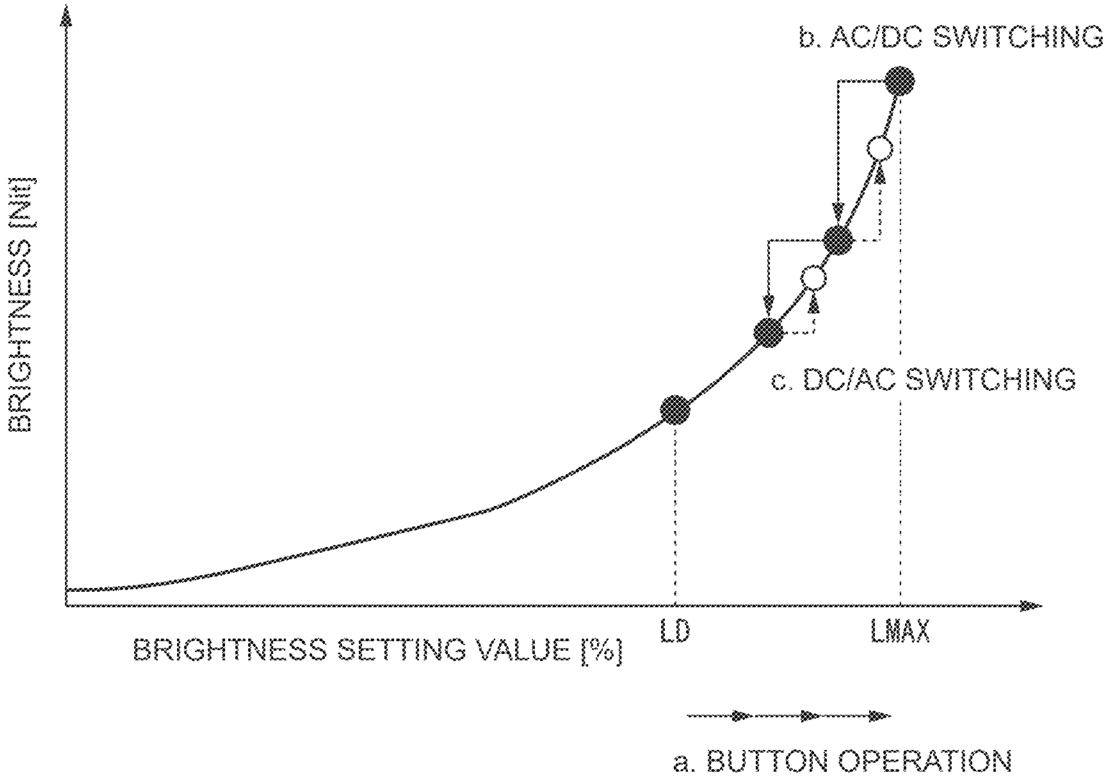
FIG. 8 illustrates a second example of a transition of the brightness setting value due to a change in the usage status.

Next, an example of a transition of the brightness setting value due to a change in the usage status will be described with reference to FIG. 8. The increase in brightness setting value by key operation and the decrease in brightness setting value by AC/DC switching are the same as in the example of FIG. 8.

Under this situation, it is assumed that the user attaches the AC adapter 48 to the slot 48*o* of the information processing apparatus 1 (c. AC/DC switching). In this case, the EC 31 detects the attachment of the AC adapter 48 and detects a change in the power source type from the battery 34 to an external power source. After a decrease in brightness setting value due to a change in power source type to the battery 34, a change in power source type from the battery 34 to the external power source is detected. Then, the brightness control unit 118 increases the brightness setting value by an increase rate that is smaller than the decrease rate used for the decrease. The brightness control unit 118 sets the increased brightness setting value to the display 14.

Figure 9:
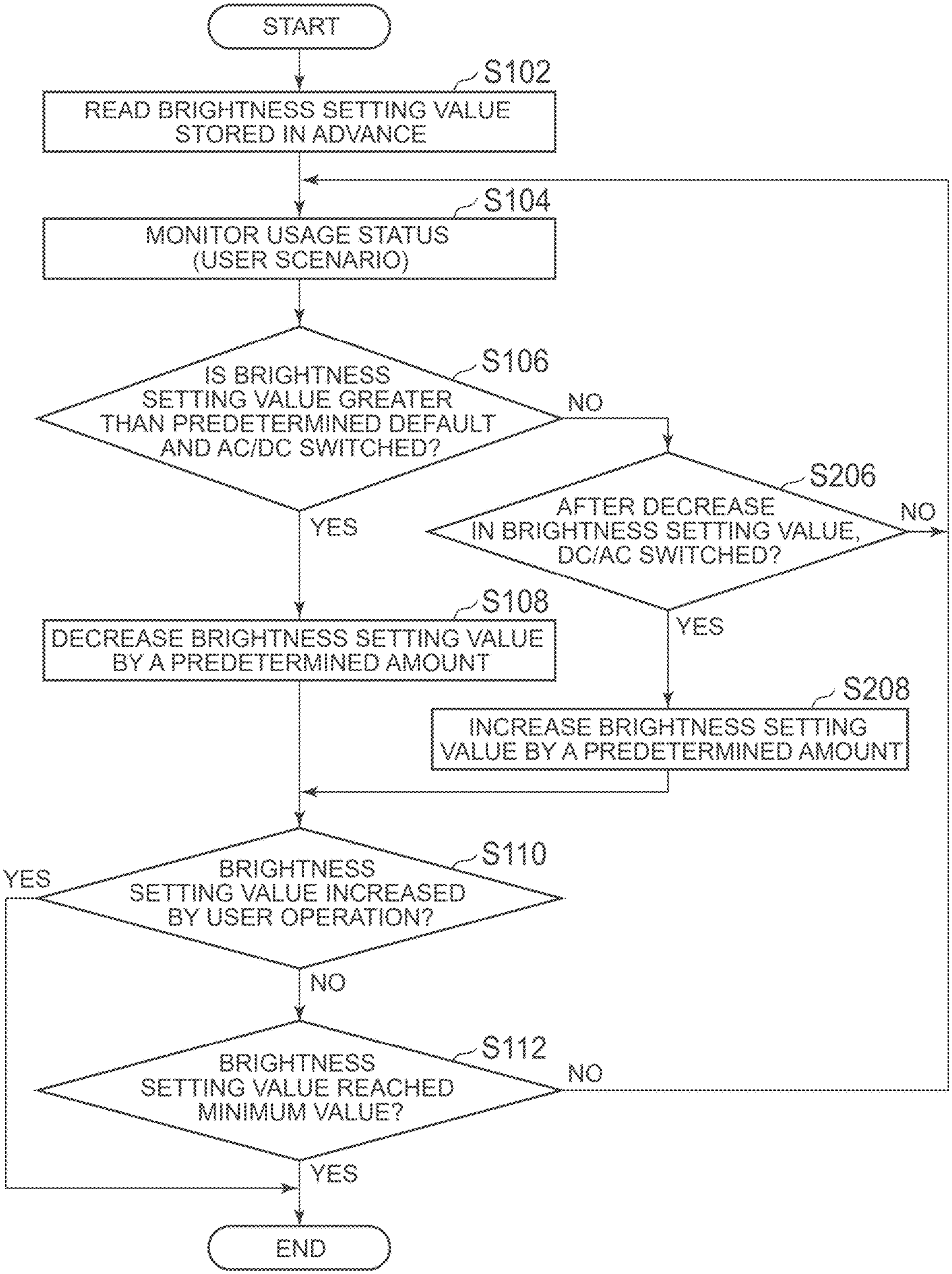
FIG. 9 is a flowchart illustrating an example of the brightness control according to one or more embodiments.

The following describes an example of the brightness control according to one or more embodiments. FIG. 9 is a flowchart illustrating an example of the brightness control according to one or more embodiments. The process in FIG. 9 includes steps S102 to S112 and steps S206 and S208. Steps S102 to S112 are the same as steps S102 to S112 in the process in FIG. 7, the descriptions of which will be incorporated herein by reference. If it is determined in step S106 that the brightness setting value is equal to or less than the reference value or the power source type is not changed to the battery 34 (step S106 NO), the process proceeds to step S206.

(Step S206) The brightness control unit 118 determines whether the brightness setting value set at that point of time is obtained due to a decrease in response to a change in power source type from an external power source to the battery 34 (AC/DC switching) and whether the power source type is changed from the battery 34 to an external power source (DC/AC switching). It is determined that the brightness setting value decreases in response to a change in power source type from an external power source to the battery 34 and that the power source type is changed to the external power source (step S206 YES), then the process proceeds to step S208. It is not determined that the brightness setting value decreases in response to a change in power source type from an external power source to the battery 34 or that the power source type is changed to an external power source (step S206 NO), then the process proceeds to step S104.

(Step S208) The brightness control unit 118 increases the brightness setting value at that point of time by an increment smaller than the decrement for the decrease in the brightness setting value. Then, the process proceeds to step S110.

Next, the following describes one or more embodiments of the present application, mainly about differences from the above embodiments. Unless otherwise specified, the components and others are common to the above embodiments and the explanation therefor is incorporated herein by reference. The differences described below may be applied to the above embodiments.

When the usage status of the information processing apparatus 1 is changed, the brightness control unit 118 adds a brightness setting value to the usage status after the change and stores the result in the storage 23. The stored information on usage status is configured as a setting history. The setting history may include information on the brightness setting value after an operation (e.g., a key operation) for instructing an increase in brightness, in association with the operation.

The brightness control unit 118 uses the setting history to derive the probability of a predetermined operation performed for each brightness setting value. The derived probability tends to be higher as the brightness setting value is smaller, and tends to be lower as the brightness setting value is larger. The brightness control unit 118 may use a predetermined mathematical model to determine a brightness setting value whose probability is equal to or less than a predetermined probability threshold (e.g., 10 to 30%) as a reference value (default value) for the brightness setting value. The probability threshold may be set to a value closer to 0% than 100%. The mathematical model that may be used includes a probability distribution function such as an error function and a sigmoid function. As input values increase, these probability distribution functions output the probability that asymptotically approaches the maximum value 1. As input values decrease, these functions output the probability that asymptotically approaches the minimum value 0. The brightness control unit 118 in one or more embodiments performs a regression analysis on the basis of the probability derived for each brightness setting value to determine a probability distribution function that enables calculation of the probability for any brightness setting value within a given value range. The brightness control unit 118 uses the obtained probability distribution function to search for a brightness setting value that is a reference value, which gives a given probability threshold.

Figure 10:
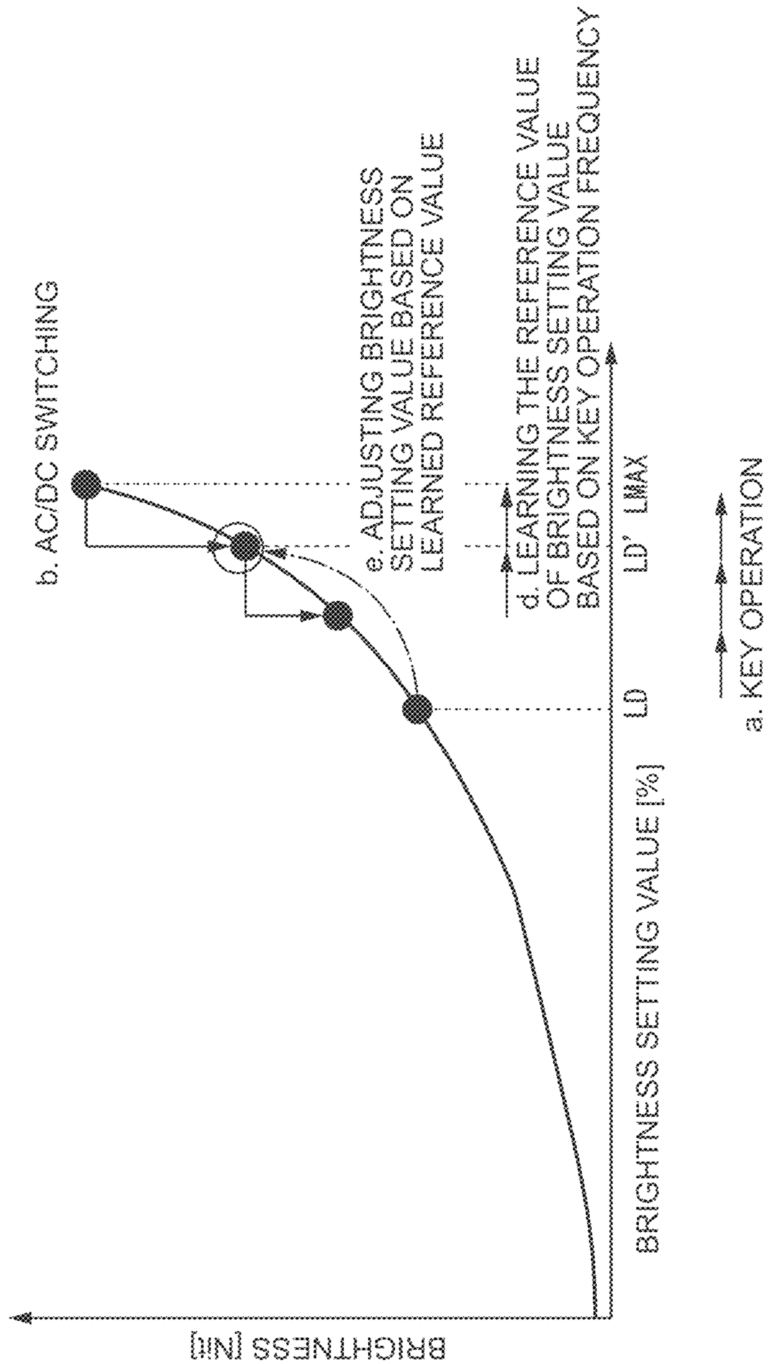
FIG. 10 describes how to set a reference value for brightness setting value according to one or more embodiments.

Referring next to FIG. 10, the following describes setting of a reference value on the basis of an operation. The increase in brightness setting value by key operation and the decrease in brightness setting value by AC/DC switching are the same as in the example of FIG. 8. Assume the initial brightness setting value is LD.

The brightness control unit 118 increases the brightness setting value by a predetermined increment each time a predetermined key operation is detected (a. key operation). If the power source type is changed from external power source to the battery 34 and the brightness setting value at that point of time is higher than the reference value of the brightness setting value when the power source type is the battery 34, the brightness control unit 118 decreases the brightness setting value at that point of time (b. AC/DC switching). In this way, each time the brightness setting value changes in accordance with a change in the usage status, the brightness control unit 118 associates the brightness setting value with the usage status and records it in the setting history.

In each piece of information included in the setting history, the brightness setting value after setting may or may not be associated with a specific key operation. The brightness control unit 118 refers to the setting history, and counts the frequency of appearance and the frequency of association with a key operation for each brightness setting value. Then, the brightness control unit 118 calculates the ratio of the latter frequency to the former frequency as the probability that a key operation will be performed. The brightness control unit 118 defines the brightness setting value whose probability calculated on the basis of the predetermined mathematical model is the predetermined probability threshold as the reference value when the power source type is a battery (d. learning the reference value of brightness setting value based on key operation). This brightness setting value may be regarded as a value at which the brightness of the display screen is sufficient and there is no need to increase the brightness by key operation. The brightness control unit 118 sets the brightness setting value LD' obtained on the basis of the setting history as the reference value (e. adjusting brightness setting value based on learned reference value). When the power source type is the battery 34, the brightness control unit 118 uses the set reference value as the minimum brightness setting value. If the power source type is changed from external power source to the battery 34 and the brightness setting value at that point of time is higher than the newly set reference value, the brightness control unit 118 decreases the brightness setting value at that point of time. Thus, if the brightness setting value at that point of time is equal to or less than the newly set reference value, the brightness control unit 118 will not decrease that brightness setting value even if the power source type is changed from external power source to the battery 34.

The brightness control unit 118 may refer to the setting history and determine a reference value of brightness setting value for each power control mode. This is because the desired brightness of the display screen may differ between power control modes. For a reference value determined for a certain power control mode, the brightness control unit 118 may update the reference value to correspond to a set of that power control mode and battery as the power source type in the brightness setting table.

The brightness control unit 118 may wait for an operation signal indicating a power control mode from the input device 32. The brightness control unit 118 refers to this brightness setting table to identify the reference value corresponding to the set of the power control mode instructed by the input operation signal and the power source type at that point of time. The brightness control unit 118 then sets the identified reference value to the display 14.

As described above, the information processing apparatus 1 according to one or more embodiments includes the power circuit 33 that receives electricity from the power supply and the brightness control unit 118 that controls the brightness of the display 14. The brightness control unit 118 has reference values of brightness setting value, including: a first reference value when the power source type is an external power source; and a second reference value that is smaller than the first reference value and when the power source type is the battery 34. The brightness control unit 118 sets the brightness setting value to a user setting value designated by the user in response to a user operation. When the user setting value is larger than the second reference value and the power source type is switched from an external power source to the battery 34, the brightness control unit 118 executes a brightness decrease process that decreases the brightness setting value to a value between the user setting value and the second reference value. When a current brightness setting value is smaller than the first reference value and the power source type is switched from the battery 34 to an external power source, the brightness control unit 118 executes a brightness increase process that increases the brightness setting value to a value between the current brightness setting value and the first reference value.

With this configuration, the user setting value, which has increased in response to the operation, is lowered when the power source type is switched to the battery 34. The brightness of the display 14 is lowered without an operation that is performed mainly for reducing the brightness. Thus, the power consumption of information processing apparatus 1 as a whole is reduced. The decreased user setting value increases when the power source type is switched to an external power source. This case allows an increase in power consumption due to the supply of electricity from the external power source, and thus enhances the visibility of the display 14 with the increased brightness.

When the power source type is switched from the battery 34 to an external power source, in the brightness increase process, the brightness control unit may increase the brightness setting value by an amount of change that is smaller than an amount of change due to a decrease in the brightness setting value in the brightness decrease process.

With this configuration, the brightness will return to a level lower than the brightness before the decrease. This reduces the impression to the user caused by excessive brightness increase.

The brightness control unit 118 may update the second reference value on the basis of a frequency of an operation by the user for each brightness setting value. With this configuration, the brightness control unit updates the reference value when the power source type is the battery 34 on the basis of the frequency distribution of user operations for each luminance setting value. A brightness setting value that is less frequently operated by the user may be used as the reference value. This improves the user's sense of satisfaction with the brightness based on the reference value.

The second reference value may be larger in a power control mode with a higher rated power of the host system 110, and the brightness control unit 118 may set the brightness setting value as a reference value corresponding to a set of the selected power control mode and the power source type.

This improves the user's sense of satisfaction with the brightness corresponding to the power control mode selected by their operation.

Note that the design items such as various setting information and parameters related to the above processing are not limited to those exemplified, and may differ according to various requirements such as the processing power of the host system 110 and the display 14. For instance, the number of power control mode stages is not limited to three stages, but may be two stages or four or more stages.

That is the detailed descriptions on the embodiments of the present invention, with reference to the drawings. The specific configuration of the present invention is not limited to the above-described embodiments, and also includes design modifications or the like within the scope of the present invention. The configurations described in the above embodiments can be combined freely.

DESCRIPTION OF SYMBOLS

1 information processing apparatus
11 processor
12 main memory
13 video subsystem
14 display
21 chipset
22 BIOS memory
23 storage
24 audio system

25 WLAN card
26 USB connector
31 EC
32 input device
33 power circuit
34 battery
36 power button
**32*k*** keyboard
**32*t*** touch pad
42 lid sensor
44 acceleration sensor
48 AC adapter
**48*o*** slot

What is claimed is:

1. An information processing apparatus comprising:

a power circuit that receives electricity supplied from a power supply; and a brightness control unit configured to control brightness of a display, the brightness control unit having reference values of brightness setting value that are setting values of the brightness:

a first reference value when a power source type is an external power source; and a second reference value that is smaller than the first reference value and when the power source type is a battery, the brightness control unit setting the brightness setting value to a user setting value designated by a user in response to a user operation, when the user setting value is larger than the second reference value and the power source type is switched from an external power source to a battery, the brightness control unit executing a brightness decrease process that decreases the brightness setting value to a value between the user setting value and the second reference value, when a current brightness setting value is smaller than the first reference value and the power source type is switched from a battery to an external power source, the brightness control unit executing a brightness increase process that increases the brightness setting value to a value between the current brightness setting value and the first reference value, wherein in the brightness increase process, the brightness control unit increases the brightness setting value by a first predetermined amount that is a first percentage value of the current brightness setting, in the brightness decrease process, the brightness control unit decreases the brightness setting value by a second predetermined amount that is a second percentage value of the user setting value, and the first percentage value is less than the second percentage value.

2. The information processing apparatus according to claim 1, wherein the brightness control unit determines a frequency distribution of user operations for different brightness setting values, and the second reference value is determined based on the frequency distribution.

3. The information processing apparatus according to claim 1, wherein the information processing apparatus includes a data table including, as the second reference value, a default setting value corresponding to each of a set of power control modes of the information processing apparatus, higher rated power control modes correspond to higher default setting values in the data table, and based on a selected power control mode and the power source type, the brightness control unit selects the corresponding default setting value from the data table.

4. A method for controlling an information processing apparatus including a power circuit that receives electricity from a power supply and a brightness control unit configured to control brightness of a display, the information processing apparatus having reference values of brightness setting value that are setting values of the brightness: a first reference value when a power source type is an external power source; and a second reference value that is smaller than the first reference value and when the power source type is a battery, the method comprising:

setting the brightness setting value to a user setting value designated by a user in response to a user operation;

when the user setting value is larger than the second reference value and the power source type is switched from an external power source to a battery, executing a brightness decrease process that decreases the brightness setting value to a value between the user setting value and the second reference value; and when a current brightness setting value is smaller than the first reference value and the power source type is switched from a battery to an external power source, executing a brightness increase process that increases the brightness setting value to a value between the current brightness setting value and the first reference value, wherein in the brightness increase process, the brightness control unit increases the brightness setting value by a first predetermined amount that is a first percentage value of the current brightness setting, in the brightness decrease process, the brightness control unit decreases the brightness setting value by a second predetermined amount that is a second percentage value of the user setting value, and the first percentage value is less than the second percentage value.

* * * * *